US005569503A

United States Patent [19]

Piotroski

[11] Patent Number: 5,569,503

[45] Date of Patent: Oct. 29, 1996

[54] MOUNTING SUBSTRATE FOR DISPLAY OF ITEMS

[75] Inventor: Edmund C. Piotroski, Darien, Conn.

[73] Assignee: C. R. Gibson Company, Nashville, Tenn.

[21] Appl. No.: 459,030

[22] Filed: May 31, 1995

[51] Int. Cl.$^{6}$ .......... B32B 7/12

[52] U.S. Cl. .......... 428/41.8; 40/768; 40/769; 40/771; 40/772; 40/773; 40/775; 40/776; 428/203; 428/205; 428/355

[58] Field of Search .......... 428/40, 355, 203, 428/205; 40/158.1, 159, 594, 661, 700, 701, 726, 751, 752, 768, 769, 771, 772, 773, 775, 776

[56] References Cited

U.S. PATENT DOCUMENTS

| | | | |
|---|---|---|---|
| 3,441,430 | 4/1969 | Peterson | 428/355 |
| 4,771,557 | 9/1988 | Bowman | 40/158.1 |
| 5,091,251 | 2/1992 | Sakumoto | 428/40 |

*Primary Examiner*—Nasser Ahmad
*Attorney, Agent, or Firm*—Waddey & Patterson; Edward D. Lanquist, Jr.

[57] ABSTRACT

The present invention relates to an adhesive coated mounting substrate with a clear plastic cover sheet that may be used for mounting and displaying relatively flat items. These mounting substrates are especially useful as pages in photograph albums. The novel advantage of the mounting substrate of the present invention is accomplished by coating the substrate with an adhesive which includes an aliphatic alkene glycol in its liquid phase and an aliphatic acrylate elastomer in its solid phase. A particularly suited use for the coated mounting substrate of the present invention is in the photographic album page art. The solid phase of the adhesive used in the production of the coated substrate of the present invention is comprised of an aliphitic alkene elastomer and an inorganic filler. The liquid phase is comprised of an aliphatic alkene glycol, water and an inorganic hydroxide pH adjuster. When the coated substrate of the present invention is used in photographic album pages, many of the disadvantages inherent in the present day latex-based photographic album pages are overcome, for example, page discoloration, photograph damaging, loss of adhesiveness after a period of time and blocking, is eliminated. Blocking is a term of the photographic album page art that indicates a phenomenon that occurs when a permanent bond between the photograph and the substrate, takes place.

21 Claims, 1 Drawing Sheet

MOUNTING SUBSTRATE FOR DISPLAY OF ITEMS

DESCRIPTION OF PRIOR ART

Photo albums with pages having a releasable adhesive substrate and transparent face sheet designed to hold photographs in place, have been available for many years. However, the previous photo album adhesive that uses organic latex could not provide a uniform and solid adhesive coverage on the substrate page. Other problems inherent in latex-based adhesive photo pages are discoloration, photo damaging and loss of adhesineness or blocking, after a period of time.

The following is a example of album pages that used such a less than desirable system, wherein it is taught to use pockets in a cover sheet to avoid having the photos fall out or are blocked in the album. This prior art does not, nor does any other latex-based prior art, anticipate or suggest, the novel releasable adhesive photo pages of the present invention. U.S. Pat. No. 4,771,557 issued to R. G. Bowman on 20 Sep. 1988, entitled Transparent Pocket for Mounting Display Items and Method of Manufacturing Same, which discloses an adhesive paraffin wax with synthetic materials and forming pockets to hold photographs in place. The development of such transparent pocket sheets are evidence of the problem that is inherent in the latex-based adhesive pages, namely they loose their adhesiveness, photos fall out of the album or blocking takes place.

OBJECTS OF THE PRESENT INVENTION

An object of the present invention is to provide a new and novel releasable adhesive substrate display sheet.

A further object of the present invention is to provide a new releasable photo album page that forms uniform and solid adhesive coverage on the page of the album.

An additional object of the present invention is to provide a new releasable photo album page that does not suffer discoloration.

A still further object of the present invention is to provide a new and improved transparent adhesive photo album page that does not damage the photographs that are stored in it.

Still an additional object of the present invention is to provide a new and improved transparent adhesive photo album page that maintains its adhesiveness over a long period of time.

Various other objects of the present invention will become obvious to those skilled in the art by reading the specification and viewing the accompanying Drawing contained herein.

SUMMARY OF THE INVENTION

The present invention is a new and useful releasable adhesive substrate. This substrate is particularly useful in the art of transparent photo albums. The novel releasable adhesive substrate of the present invention was developed because of the latex-based adhesive that have existed would cause the discoloration of substrate pages due to oxidation and aging. The latex-based adhesivė also damages photos and the coated substrate loses it's adhesion or blocking takes place.

The novel releasable adhesive coated substrate of the present invention overcomes the shortcomings of the adhesives of the past. The releasable adhesive pages of the present invention are composed of a dual sided substrate coated with an adhesive having a solid phase and a liquid phase. The solid phase is comprised of an aliphatic arcylate elastomer and an inorganic oxide filler. The elastomer may be selected from the group consisting of methyl, butyl, propyl and isopropyl acrylate elastomers. The inorganic oxide filler may be selected from the group consisting of aluminum oxide, calcium oxide, titanium oxide and silicon dioxide. The liquid phase is comprised of an aliphatic alkene glycol and water. The glycol may be selected from the group consisting of methylene, ethylene, propylene and isopropylene glycol.

A pH adjuster is also part of the liquid phase of the composition and may be selected from the group consisting of sodium, calcium, lithium, potassium and ammonium hydroxide. The preferred combination is butyl acrylate elastomer and silicon dioxide in the solid phase and propylene glycol, ammonium hydroxide and water in the liquid phase.

After the adhesive is applied to the dual-sided substrate, a clear plastic film is attached to each side of the dual-sided coated substrate in the usual manner. The preferred photo album film material is biaxially oriented polypropylene (BOPP) film, with a thickness of from about 0.001 to about 0.003 inches. It has been found that BOPP film is especially suited and compatible with most photographic prints and will not react with or otherwise degrade pictures.

Figure 1:
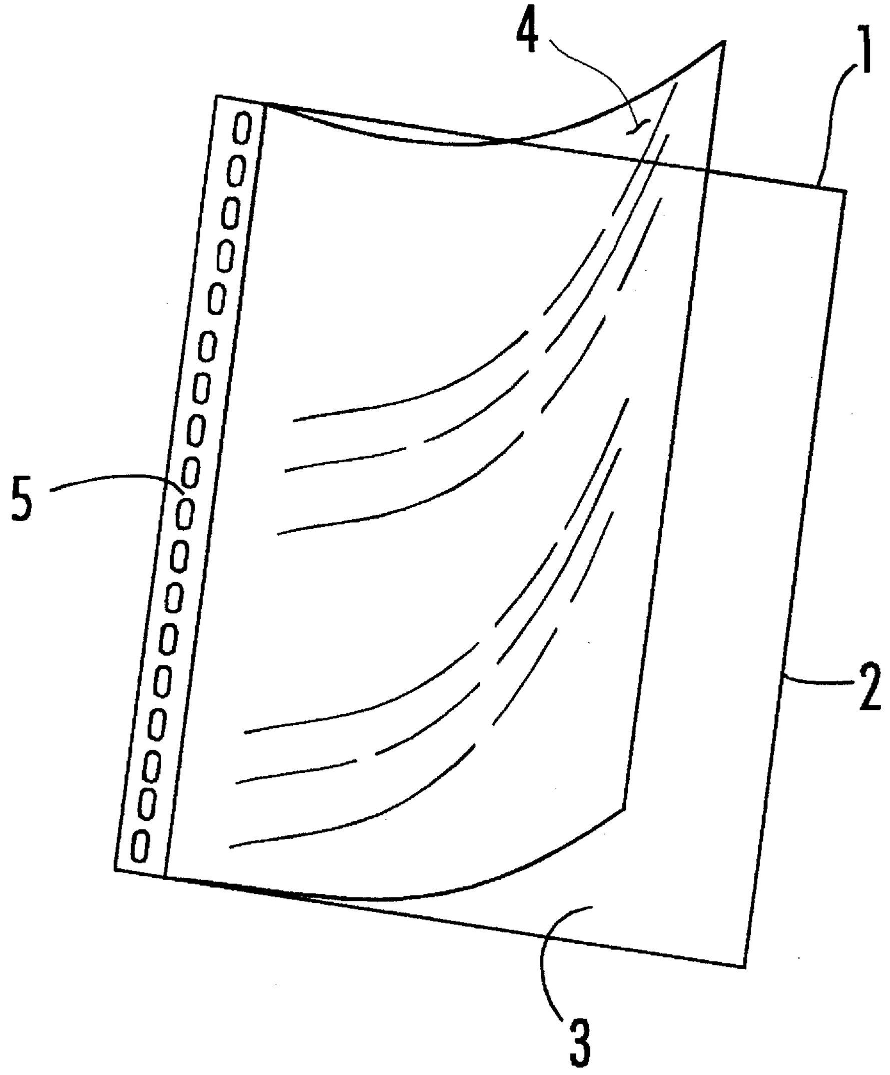
FIG. 1. is a plan view of a releasable adhesive substrate showing one side of the substrate page with the plastic cover film attached.

DETAILED DESCRIPTION OF THE PREFERRED EMBODIMENT OF THE RELEASABLE ADHESIVE PHOTO ALBUM PAGE

Referring now to FIG. 1., wherein a releasable substrate page (one side) is shown at 1, the one side of the dual sided substrate is at 2, the adhesive coating on said substrate 2 is at 3, the plastic cover film is at 4 and the end binding is shown at 5.

The adhesive utilized in the substrate pages of the present invention is comprised of a liquid phase and a solid phase. The liquid phase consists of an aliphatic alkene glycol and water, with a small amounts of a pH adjuster. The aliphatic alkene glycol may be selected from the group consisting of methylene, ethylene butylene, propylene and isopripylene glycol. The preferable aliphatic alkene glycol is propylene glycol. The pH adjuster is an inorganic hydroxide adjuster and as used herein, may be selected from the group consisting of sodium, lithium, potassium, calcium magnesium and ammonium hydroxide. The preferable adjuster is ammonium hydroxide. The liquid phase of the releasable adhesive compound constitutes from about 55 to about 65 percent of the total adhesive. by weight, with a preferable range from about 58 to about 62 percent by weight.

The solid phase of the releasable adhesive compound constitutes from about 35 to about 45 percent, with a preferable range of from about 38 to about 42 percent by weight of the total adhesive and is comprised of an inorganic oxide filler and an aliphatic acrylate elastomer. The inorganic oxide filler may be selected from the group consisting of calcium, aluminum, titanium, magnesium and silicon oxides with the preferable filler being silicon dioxide. The aliphatic acraylate may be selected from the group consisting of methyl, ethyl, butyl, propyl and isopropyl acrylate with the preferred acrylate elastomer being butyl acrylate elastomer.

The adhesive used to coat the dual sided releasable adhesive substrate page of the present invention is illustrated in the Examples that follow:

EXAMPLE 1

| INGREDIENTS | PERCENTAGES |
|---|---|
| (liquids) | |
| Propylene Glycol | 6.00 by Wt. |
| Water | 93.70 by Wt. |
| Ammonium Hydroxide (Na OH) | 0.30 by Wt. |
| (Solids) | |
| Silicon Dioxide | 5.70 by Wt. |
| Butyl Acrylate Elastomer | 94 30 by Wt. |

EXAMPLE II

| INGREDIENTS | PERCENTAGES |
|---|---|
| (liquids) | |
| Ethylene Glycol | 7.00 by Wt. |
| Water | 92.90 by Wt. |
| Ammonium Hydroxide | 0.10 by Wt. |
| (solids) | |
| Calcium Oxide | 6.10 by Wt. |
| Methyl Acrylate Elastomer | 93.90 by Wt. |

EXAMPLE III

| INGREDIENTS | PERCENTAGES |
|---|---|
| (liquids) | |
| Propylene Glycol | 6.30 by Wt. |
| Water | 93.50 by Wt. |
| Ammonium Hydroxide | 0,20 by Wt. |
| (solids) | |
| Silicon Dioxide | 5.40 by Wt. |
| Butyl Acrylate Elastomer | 94.60 by Wt. |

EXAMPLE IV

| INGREDIENTS | PERCENTAGES |
|---|---|
| (liquids) | |
| Isopropylene Glycol | 6.50 by Wt. |
| Water | 93.30 by Wt. |
| Sodium Hydroxide | 0.20 by Wt. |
| (solids) | |
| Titanium Oxide | 5.50 by Wt. |
| Ethyl Acrylate Elastoimer | 94.50 by Wt. |

The releasable adhesive composition, as shown and described in EXAMPLE III, supra. and the presently available organic latex coated photo album pages were subjected to a Photographic Activity Test, which is a test to measure the interaction of the adhesive with the silver salts of the photograph stored, and a Gelatin Staining Test, which is an accelerated aging test used to determine the extent of discoloration improvement that the album pages of the present invention has made over the organic latex adhesives that are now available on the market. These test were conducted by the Image Permanence Institute, 70 Lamb Memorial Drive, Rochester, N.Y. and the results of the comparative tests are shown in the following Tables I, II, Ia and IIa:

TABLE I

| SILVER IMAGE INTERACTION |
|---|
| Density Change Caused by Control = −1.05 |
| Oxidation Limit (control + 20%)* = −1.25 |
| Density Reduction Change = −1.04 |
| Reduction Limit (control − 20%** = −0.84 |

*upper limit
**lower limit

TABLE II

| GELATIN STANING |
|---|
| Staining Caused by Control = 0.10 |
| Stain Limit (control = 0.08) = 0,18 |
| Staining Caused = 0.10 |

As can be seen by the test results above, the adhesive utilized in the substrate pages of the present invention clearly passed both of the new standard photographic Activity Tests as conducted by the Image Permanence Institute, which were conducted in 1994, and are much stricter than the prior ANIS standard IT 9.2 for Photographic Activity, that were carried out by the Image Permanence Institute, RIT City Center, 50 West Main Street, Rochester, N.Y., on latex-based adhesives. The results of the earlier tests by the Image Permanence Institute on latex-based adhesive is shown in the following Tables:

TABLE Ia

| SILVER IMAGE INTERACTION |
|---|
| Density Change Caused by Control = −0.70 |
| Oxidation Limit (control) 6x = −0.36 |
| Density Reduction Change = −0.34 |
| Reduction Limit < control value (FAILED) |

TABLE Iia

| GELATIN STAINING |
|---|
| Staining Caused by Control = 0.10 |
| Stain Limit (control + 0.18) = 0.18 |
| Staining Caused = 0.11 |
| (PASSED) |

While the latex-based adhesive passed the Gelatin Staining Test, it was still not as good as the results obtained for the adhesive utilized on the substrate pages of the present invention in the much stricter Image Permanence Institute Photographic Activity Test. However, the requirements of the Image Permanence Institute are that all materials must pass all criteria to pass, not just one test. The latex-based adhesive failed to pass the Silver Image Interaction Test and therefore, did not obtain a "pass" rating from the Image Permanence Institute.

It is now evident that the novel dual-sided releasable adhesive substrate pages of the present invention constitute a significant advance in the art. The pages are coated on the substrate's both sides more completely and more smoothly than the prior art. The substrate pages of the present invention, when used as photographic album pages, are safer for the photographs than the pages of the prior art. The instant pages are considerably less susceptible to discoloration than the pages of the prior art and the pages of the present invention do not loose their adhesiveness over a period of time nor do they suffer from blocking.

While the description, supra., contains many spicificites, the reader should not construe these as limitations on the scope of the invention, but merely as exemplification of a preferred embodiment of the present invention. Those skilled in the art, will envision that many other possible variations are within the scope of the present invention. For example, skilled artisans will readily be able to change the dimensions and the materials of the various embodiments. They can make variations on the design of the present invention. Accordingly, the reader is requested to determine the scope of the present invention only by the scope of the appended claims and their legal equivalents, taken in view of the scope of this specification, and not only by the examples that have been given herein.

What is claimed is:

1. A photograph album page for releasably mounting photographs thereon, said album page having a mounting surface and a transparent cover sheet between which said photographs are directly mounted on said mounting surface, wherein said mounting surface includes a releasable adhesive material coated thereon for releasably securing said photographs to said mounting surface which consists of a liquid phase including an aliphatic alkene glycol and water, and a solid phase including an aliphatic acrylic elastomer and an inorganic oxide filler material.

2. The album page of claim 1, wherein said album page includes two opposed mounting surfaces and wherein said releasable adhesive material is coated on both surfaces.

3. The album page of claim 1, wherein said adhesive material includes in the liquid phase, an aliphatic alkene glycol, water and an inorganic hydroxide pH adjuster.

4. The album page of claim 1, wherein said transparent cover sheet is attached to an edge of said page.

5. The album page of claim 1, wherein the liquid phase of said adhesive material comprises between about 55% and about 65% by weight of the adhesive material and wherein said liquid phase comprises between about 35% and about 45% by weight of said adhesive material.

6. The album page of claim 5, wherein the liquid phase comprises about 60% by weight of the adhesive material and the solid phase comprises about 40% by weight of the adhesive material.

7. The album page of claim 1, wherein said aliphatic alkene glycol is selected from the group consisting of methylene, ethylene, butylene, propylene and isopropylene glycol.

8. The album page of claim 1, wherein said liquid phase further includes water and an inorganic hydroxide pH adjuster.

9. The album page of claim 6, wherein said inorganic hydroxide is selected from the group consisting of sodium, lithium, potassium, calcium and ammonium hydroxide.

10. The album page of claim 1, wherein said inorganic oxide filler material is selected from the group consisting of calcium, aluminum, titanium, magnesium and silicon oxides.

11. The album page of claim 1, wherein said aliphatic acrylate elastomer is selected from the group consisting of methyl, ethyl, butyl, propyl and isopropyl acrylate elastomers.

12. The album page of claim 1, wherein said liquid phase consists of an aliphatic alkene glycol in an amount between about 5% and about 10% by weight of the total weight of the liquid phase, water in an amount between about 90% and about 95% by weight of the total weight of the liquid phase, and an inorganic hydroxide pH adjuster in an amount between about 0.1% and about 0.7% by weight of the total weight of the liquid phase.

13. The album page of claim 12, wherein said aliphatic alkene glycol is propylene glycol present in an amount about 6.3% by weight of the total weight of the liquid phase.

14. The album page of claim 12, wherein said inorganic hydroxide pH adjuster is ammonium hydroxide present in an amount about 0.3% by weight of the total weight of the liquid phase.

15. The album page of claim 1, wherein said solid phase consists of an aliphatic acrylic elastomer in an amount between about 2% and about 8% by weight of the total weight of the solid phase and an inorganic oxide filler material in an amount between about 92% and about 98% by weight of the total weight of the solid phase.

16. The album page of claim 15, wherein said aliphatic acrylic elastomer is a butyl acrylate elastomer present in an amount about 94.6% by weight of the total weight of the solid phase.

17. The album page of claim 15, wherein said inorganic oxide filler is silicon dioxide present in an amount about 5.4% by weight of the total weight of the solid phase.

18. A photograph album page for releasably mounting photographs thereon, said album page having a pair of opposed mounting surfaces each having a transparent cover sheet between which said photographs are directly mounted onto said mounting surfaces, wherein said mounting surfaces each include a releasable adhesive material coated thereon for releasably securing said photographs to said mounting surface which consists of a liquid phase which includes an aliphatic alkene glycol and a solid phase which includes an aliphatic acrylic elastomer and an inorganic oxide filler material.

19. A photograph album page for releasably mounting photographs thereon, said album page having a mounting surface and a transparent cover sheet between which said photographs are directly mounted onto said mounting surface, wherein said mounting surface has a releasable adhesive material coated thereon for releasably securing said photographs to said mounting surface which consists of a liquid phase which includes an aliphatic alkene glycol, water and an inorganic hydroxide pH adjuster and a solid phase which includes an aliphatic acrylic elastomer and an inorganic filler material, wherein said liquid phase consists of an aliphatic alkene glycol in an amount between about 5% and about 10% by weight of the total weight of the liquid phase, water in an amount between about 90% and about 95% by weight of the total weight of the liquid phase and an inorganic hydroxide pH adjuster in an amount between about 0.1% and about 0.7% by weight of the total weight of the liquid phase and wherein said solid phase consists of an aliphatic acrylic elastomer in an amount between about 2% and about 8% by weight of the total weight of the solid phase and an inorganic oxide filler material in an amount between about 92% and about 98% by weight of the total weight of the solid phase.

20. The album page of claim 19, wherein the liquid phase of said adhesive material comprises between about 55% and about 65% by weight of the adhesive material and wherein said liquid phase comprises between about 35% and about 44% by weight of said adhesive material.

21. A photography album including at least one album page for releasably mounting photographs thereon, wherein said at least one album page includes a mounting surface and a transparent cover sheet between which said photographs are directly mounted, said mounting surface having a releasable adhesive material coated thereon for releasably securing said photographs to said mounting surface which consists of a liquid phase including an aliphatic alkene glycol and water, and a solid phase including an aliphatic acrylic elastomer and an inorganic oxide filler material.

* * * * *

UNITED STATES PATENT AND TRADEMARK OFFICE
Certificate

Patent No. 5,569,503 Patented: October 29, 1996

On petition requesting issuance of a certificate for correction of inventorship pursuant to 35 U.S.C. 256, it has been found by the United States District Court for the Northern District of New York that the above identified patent, through error of the C.R. Gibson Company and without deceptive intent on Howard B. Kaye's part, improperly sets forth the inventorship.

Accordingly, it is hereby certified that the correct inventorship of this patent is: Howard B. Kaye, Syracuse, NY.

Signed and Sealed this Nineteenth Day of September, 2000.

ELLIS P. ROBINSON,
*Supervisory Patent Examiner*
Art Unit 1772